US009260901B2

(12) United States Patent
Ishida et al.

(10) Patent No.: US 9,260,901 B2
(45) Date of Patent: Feb. 16, 2016

(54) DOOR-OPENING/CLOSING DEVICE FOR USE IN VEHICLE

(75) Inventors: Toshihiko Ishida, Niwa-gun (JP); Wataru Otake, Kasugai (JP); Takeshi Nishikibe, Tokai (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/351,896

(22) PCT Filed: Sep. 13, 2012

(86) PCT No.: PCT/JP2012/073420
§ 371 (c)(1),
(2), (4) Date: Apr. 15, 2014

(87) PCT Pub. No.: WO2013/061706
PCT Pub. Date: May 2, 2013

(65) Prior Publication Data

US 2014/0245666 A1 Sep. 4, 2014

(30) Foreign Application Priority Data

Oct. 25, 2011 (JP) ................................ 2011-234065

(51) Int. Cl.
*E05F 15/632* (2015.01)
*B60J 5/06* (2006.01)
*E05F 15/60* (2015.01)

(52) U.S. Cl.
CPC ................. *E05F 15/632* (2015.01); *B60J 5/06* (2013.01); *E05F 15/60* (2015.01); *E05Y 2201/434* (2013.01); *E05Y 2201/46* (2013.01); *E05Y 2900/531* (2013.01)

(58) Field of Classification Search
CPC ......... E05F 15/14; E05F 15/60; E05F 15/632; E05F 15/18; B60J 5/06
USPC ............ 49/360, 358, 449, 451; 188/156, 158, 188/161
See application file for complete search history.

(56) References Cited

U.S. PATENT DOCUMENTS 4,698,560 A * 10/1987 Andrei-Alexandru et al. . 318/54
4,727,679 A * 3/1988 Kornbrekke et al. ........... 49/138
(Continued)

FOREIGN PATENT DOCUMENTS

JP 6-13357 Y2 4/1994
JP 2009-293257 A 12/2009
(Continued)

OTHER PUBLICATIONS

International Search Report (PCT/ISA/210) mailed on Nov. 27, 2012, by the Japanese Patent Office as the International Searching Authority for International Application No. PCT/JP2012/073420.
(Continued)

*Primary Examiner* — Katherine Mitchell
*Assistant Examiner* — Marcus Menezes
(74) *Attorney, Agent, or Firm* — Buchanan Ingersoll & Rooney PC

(57) ABSTRACT

A door opening/closing device for use in a vehicle is provided with a driving member. The driving member has a permanent-magnet motor provided with two terminals and an output member, which is rotationally driven by the permanent-magnet motor. The driving member is mounted on either a vehicle body or a vehicle door and is coupled to the other via the output member. As the output member rotates, the vehicle door opens or closes. The door opening/closing device is also provided with a switching device configured to switch the permanent-magnet motor between an energizable state, in which the permanent-magnet motor can receive electricity through the two terminals, and a brake state, in which the terminals are short-circuited. The switching device switches the permanent-magnet motor into the brake state when the vehicle door is in any position other than the fully closed position.

10 Claims, 5 Drawing Sheets

(56) References Cited

U.S. PATENT DOCUMENTS

| | | | | |
|---|---|---|---|---|
| 6,148,967 | A * | 11/2000 | Huynh | 188/164 |
| 7,045,985 | B2 * | 5/2006 | Huang et al. | 318/701 |
| 8,596,424 | B2 * | 12/2013 | Rauscher et al. | 188/72.7 |
| 2001/0054257 | A1 * | 12/2001 | Wygle et al. | 49/349 |
| 2004/0113456 | A1 * | 6/2004 | Greuel et al. | 296/146.8 |
| 2007/0283628 | A1 * | 12/2007 | Gotou et al. | 49/360 |
| 2009/0302637 | A1 * | 12/2009 | Iijima | 296/155 |
| 2010/0301785 | A1 * | 12/2010 | Davis et al. | 318/365 |
| 2013/0123056 | A1 | 5/2013 | Ishida | |

FOREIGN PATENT DOCUMENTS

| | | | |
|---|---|---|---|
| JP | 2012-087611 | A | 5/2012 |
| JP | 2012-097487 | A | 5/2012 |

OTHER PUBLICATIONS

Technical description of new car model, VOXY, with the English translation of the drawing, 2001 (month unknown) 4 pgs.

* cited by examiner

DOOR-OPENING/CLOSING DEVICE FOR USE IN VEHICLE

FIELD OF THE INVENTION

The present invention relates to a door-opening/closing device for use in a vehicle.

BACKGROUND OF THE INVENTION

Conventionally, door-opening/closing devices for use in a vehicle have been proposed in, for example, Patent Document 1. According to such a device, a vehicle slide door 81 is supported to be movable in the fore-and-aft direction of a vehicle body 82 as shown in FIG. 8. The slide door 81 moves in the fore-and-aft direction by driving force of a driving member 83 provided on the vehicle body 82 or manual operating force to open and close a door opening 82*a* formed on the side portion of the vehicle body 82. That is, the slide door 81 moves in a range from a fully closed position, at which the door opening 82*a* is closed, to a fully open position, at which the door opening 82*a* is fully opened.

The driving member 83 includes a reversible motor 84 and a drum 85, which is rotationally driven by the motor 84.

A power transmission cable 86, the ends of which are connected to the slide door 81, is wound around the drum 85. The driving member 83 drives the slide door 81 by winding and unwinding the cable 86 through rotation of the motor 84 in accordance with the rotation direction of the motor 84.

An electromagnetic clutch is provided in a power transmission path between the motor 84 and the drum 85 and selectively enables and disables the power transmission path. The electromagnetic clutch is switched to a connected state when the slide door 81 is electrically opened or closed to transmit rotation of the motor 84 to the drum 85. The electromagnetic clutch is switched to a disabled state when the slide door 81 is manually opened or closed, and prevents rotation of the drum 85 from being transmitted to the motor 84. This is to allow the slide door 81 to be opened or closed with small operating force by separating rotation torque of the drum 85 from the motor 84 when, in particular, the slide door 81 is opened or closed manually.

A full-close lock 91, which retains the slide door 81 at the fully closed position by engaging with the vehicle body 82, and a full-open lock 92, which retains the slide door 81 at the fully open position by also engaging with the vehicle body 82, are provided on the slide door 81. The full-open lock 92 is disengaged from the vehicle body 82 upon reception of manual operating force from a manipulation lever 93 or electrical operating force from a release actuator 94, and allows the slide door 81 to be closed.

PRIOR ART DOCUMENTS

Patent Documents

Patent Document 1: Japanese Laid-Open Patent Publication No. 2009-293257

SUMMARY OF THE INVENTION

In Patent Document 1, however, since the full-open lock 92, which retains the slide door 81 at the fully open position (operating position other than the fully closed position), and the release actuator 94, which releases the full-open lock 92, are necessary, the number of components and the weight of the slide door 81 are undesirably increased.

Accordingly, it is an objective of the present invention to provide a door-opening/closing device for use in a vehicle that prevents the number of components and the weight of the vehicle door from being increased.

To achieve the foregoing objective and in accordance with one aspect of the present invention, a door-opening/closing device for use in a vehicle is provided. The door-opening/closing device includes a driving member and a switching unit. The driving member includes a permanent magnet motor with two terminals and an output member rotationally driven by the permanent magnet motor. The driving member is configured to be located on one of a vehicle body and a vehicle door and connected to the other one of the vehicle body and the vehicle door via the output member, so that the vehicle door is opened and closed in accordance with rotation of the output member. The switching unit is configured to selectively switch the permanent magnet motor between an energizable state, in which electricity can be received via the two terminals, and a brake state, in which the terminals are short-circuited. When the vehicle door is at any operating position other than a fully closed position, the switching unit switches the permanent magnet motor into the brake state.

With this configuration, when electricity is supplied to the permanent magnet motor via the terminals in the energizable state, the permanent magnet motor is activated. The output member is then rotated in one direction, and the vehicle door is opened accordingly, or the output member is rotated in a reverse direction, and the vehicle door is closed accordingly. When the permanent magnet motor is switched to the brake state, in which the terminals are short-circuited, the permanent magnet motor is brought into a state where great cogging torque may be generated. Utilizing the cogging torque as a brake for the permanent magnet motor (and the output member) permits the vehicle door to be retained at an operating position other than the fully closed position even on, for example, a slope road. In addition, switching the permanent magnet motor from the brake state to the energizable state cancels the state in which the permanent magnet motor may cause great cogging torque, and thus releases the vehicle door retained at the operating position other than the fully closed position. In this manner, since retaining and releasing of the vehicle door is performed by electrically switching the circuit with the switching unit, the configuration of the entire device is further simplified. The number of components and the weight of the vehicle door are thus prevented from increasing.

DETAILED DESCRIPTION OF THE PREFERRED EMBODIMENTS

One embodiment of the present invention will now be described with reference to FIGS. 1 to 6. The term "fore-and-aft direction" in the following description means the fore-and-aft direction of a vehicle.

Figure 1:
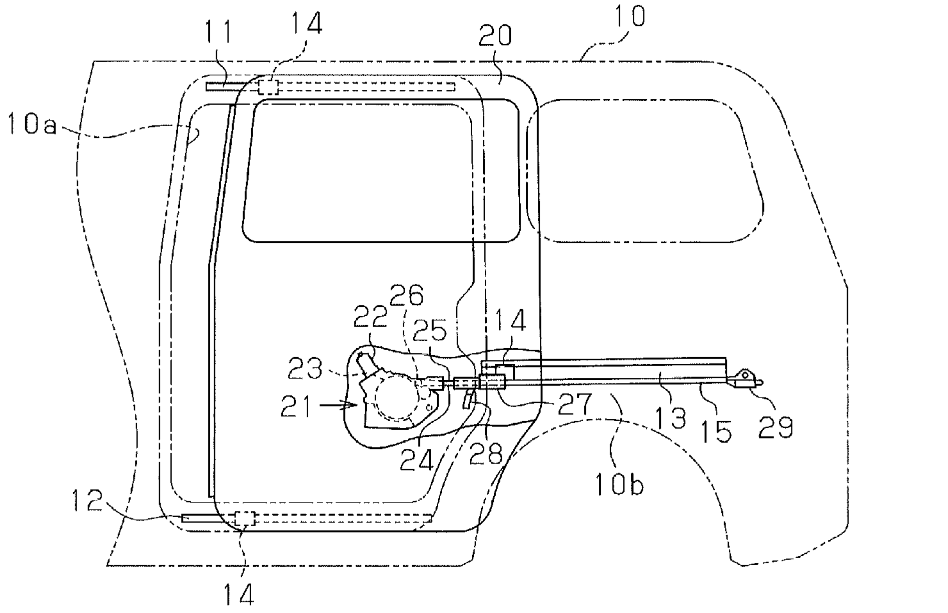
FIG. 1 is a schematic view illustrating, together with part of a vehicle, a door-opening/closing device for use in a vehicle according to one embodiment of the present invention.

As shown in FIG. 1, an upper rail 11 and a lower rail 12 are located on a vehicle body 10 along an upper edge and a lower edge of a door opening 10*a* formed on the side portion of the vehicle body 10. The vehicle body 10 includes a quarter panel 10*b* located at the rear of the door opening 10*a* and a center rail 13 located on the quarter panel 10*b* to extend in the fore-and-aft direction. A vehicle door, which is a slide door 20 in this embodiment, is supported by the upper rail 11, the lower rail 12, and the center rail 13 via a guide roller unit 14 to be movable in the fore-and-aft direction. The slide door 20 opens and closes the door opening 10*a* in accordance with the movement in the fore-and-aft direction. That is, the slide door 20 moves in a range from a fully closed position, at which the door opening 10*a* is closed, to a fully open position, at which the door opening 10*a* is fully opened. A cable guide 15 is located on the quarter panel 10*b*, and extends along the lower edge of the center rail 13 over the entire length of the center rail 13.

A driving member 21 is secured to the rear interior part of the slide door 20 to be located substantially at the same level as the center rail 13. The driving member 21 includes a drive motor 22, which is a permanent magnet motor, and a drum 23, which serves as an output member rotationally driven by the drive motor 22. A first cable 24 and a second cable 25 are wound around the drum 23. The first and second cables 24, 25 are each wound around the drum 23 with respective first ends secured to the drum 23. The first and second cables 24, 25 are selectively wound around and unwound from the drum 23 in accordance with activation of the driving member 21. The driving member 21 further includes an intermediate pulley 26. The first and second cables 24, 25 each extend from the slide door 20 to the vehicle body 10 via the intermediate pulley 26 and a guide pulley 27 coupled to the guide roller unit 14, which moves along the center rail 13. The first and second cables 24, 25 thus extend in the fore-and-aft direction along the cable guide 15. The intermediate pulley 26 and the guide pulley 27 are arranged substantially at the same level as the center rail 13 and at the rear of the drum 23 with a gap therebetween. The first cable 24 is guided by the cable guide 15 and extends forward. The first cable 24 is connected to the vehicle body 10 at the front end of the cable guide 15 via a tensioner 28 that is connected to a second end of the first cable 24. The second cable 25 is also guided by the cable guide 15 and extends rearward. The second cable 25 is connected to the vehicle body 10 at the rear end of the cable guide 15 via a tensioner 29 that is connected to a second end of the second cable 25.

When, for example, the second cable 25 is wound while the first cable 24 is unwound by the driving member 21, the slide door 20 moves rearward to open the door opening 10*a*. When, in contrast, the second cable 25 is unwound while the first cable 24 is wound by the driving member 21, the slide door 20 moves forward to close the door opening 10*a*.

Figure 2:
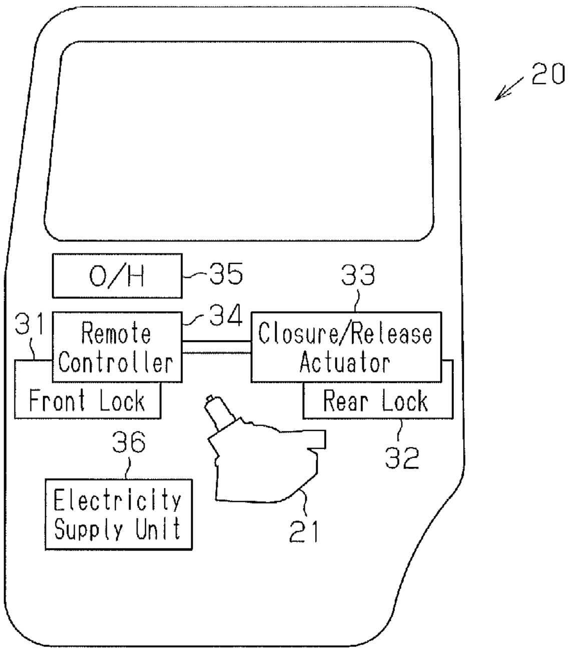
FIG. 2 is a schematic view illustrating the door-opening/closing device for use in a vehicle of FIG. 1.

As shown in FIG. 2, a front lock 31 and a rear lock 32 are provided in the slide door 20. The front lock 31 and the rear lock 32 retain the slide door 20 at the fully closed position by engaging with the vehicle body 10. A closure/release actuator 33, which is drivingly coupled to the rear lock 32, is also provided in the slide door 20. The closure/release actuator 33 closes the slide door 20 from an ajar position to the fully closed position and also functions to cause the rear lock 32 to release the slide door 20 when retained at the fully closed position. The closure/release actuator 33 is mechanically linked to the front lock 31 via a remote controller 34, and also causes the front lock 31 to release the slide door 20 retained at the fully closed position.

The front lock 31 and the rear lock 32 are mechanically linked to an operation handle 35 located on the slide door 20, and release the slide door 20 retained at the fully closed position upon reception of manual operating force from the operation handle 35.

That is, when electric operating force (electric driving force) from the closure/release actuator 33 or manual operating force from the operation handle 35 is transmitted to the front lock 31 and the rear lock 32 while the front lock 31 and the rear lock 32 retain the slide door 20 at the fully closed position, the front lock 31 and the rear lock 32 disengage the slide door 20 from the vehicle body 10 to allow the slide door 20 to be opened.

An electricity supply unit 36 for constantly supplying electricity to the closure/release actuator 33 is provided on the slide door 20 together with the driving member 21.

Figure 3:
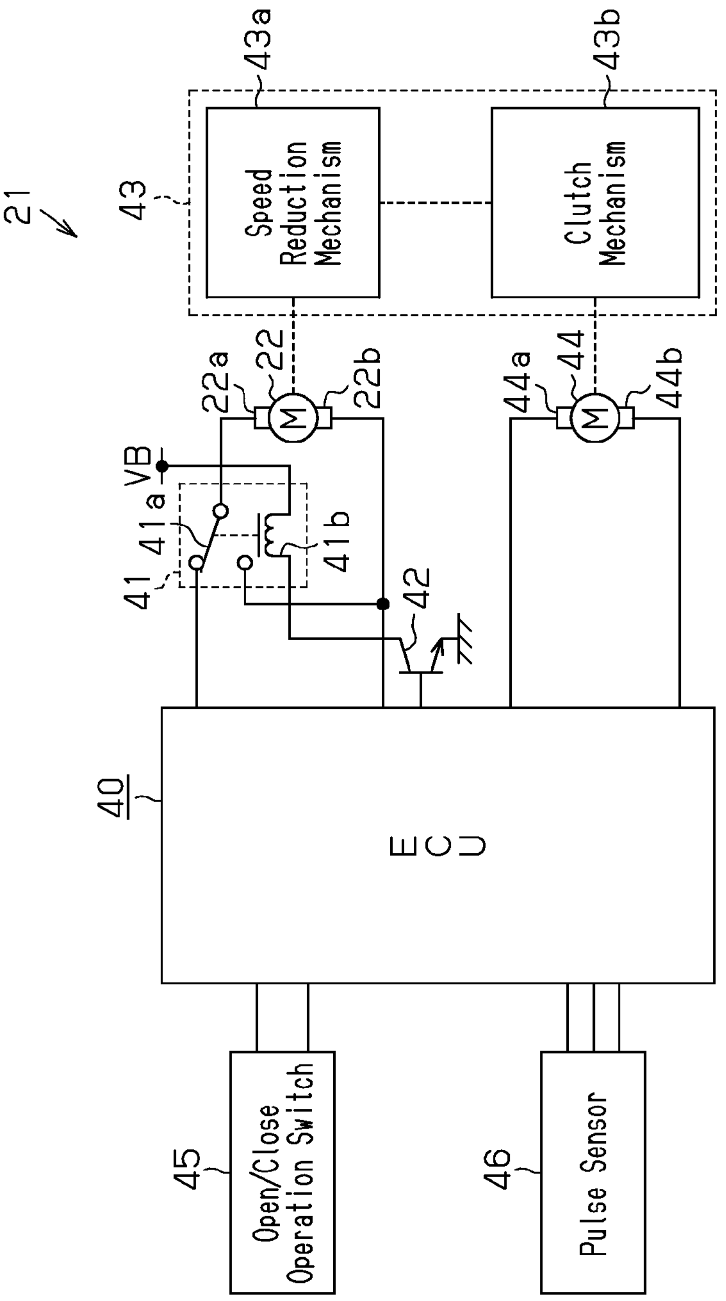
FIG. 3 is a circuit diagram illustrating the electrical configuration of the door-opening/closing device for use in a vehicle of FIG. 1.

The electrical configuration of the present embodiment will now be described. As shown in FIG. 3, an electronic control unit (ECU) 40 for opening and closing control of the slide door 20 is mainly configured by, for example, a microcontroller (MCU), and is located in the driving member 21. The ECU 40 is electrically connectable to a first terminal 22*a* of the drive motor 22 via, for example, a movable piece 41*a* of a single-pole double-throw relay 41, and is electrically connected to a second terminal 22*b* of the drive motor 22. The terminals 22*a*, 22*b* of the drive motor 22 are electrically connectable, that is, can be short-circuited via the movable piece 41*a* of the relay 41. An excitation coil 41*b* of the relay 41 includes a terminal connected to a positive pole (VB) of the electricity supply unit 36 and a terminal connected to a collector of an NPN transistor 42. The transistor 42 includes a grounded emitter and a base connected to the ECU 40. The relay 41 and the transistor 42 configure a switching unit together with the ECU 40.

When the base of the transistor 42 is maintained in a de-energized state and the transistor 42 is off, the relay 41 electrically connects the ECU 40 to the first terminal 22*a* of the drive motor 22 via the movable piece 41*a*, and brings the drive motor 22 into an energizable state. At this time, the ECU 40 activates the drive motor 22 by supplying voltage to the drive motor 22 from the electricity supply unit 36 through the terminals 22*a*, 22*b*. The ECU 40 is capable of switching the direction of current to be supplied to the drive motor 22, and is capable of rotating the drive motor 22 in a first direction or a second direction opposite to the first direction in accordance with the direction of the current. That is, the drive motor 22 is automatically brought into the energizable state when the switching units (41, 42) are not performing switching control (de-energized).

When the ECU 40 switches the base of the transistor 42 into an energized state and the transistor 42 is switched on, the relay 41 short-circuits the terminals 22*a*, 22*b* of the drive motor 22 via the excitation coil 41*b*. At this time, the drive motor 22 is electrically disconnected from the ECU 40, and is brought into a brake state, where great cogging torque may be generated.

The drive motor 22 is mechanically coupled to the drum 23 via a speed reduction mechanism 43*a* of a mechanism part 43 embedded in the driving member 21. Thus, when the drive motor 22 is activated, rotation of the drive motor 22 is decelerated by the speed reduction mechanism 43*a* and is transmitted to the drum 23. The speed reduction mechanism 43*a* of the present embodiment is configured to decelerate with high efficiency, and is configured by a combination of, for example, a skew gear mechanism and a planet gear mechanism. The skew gear mechanism includes a pinion directly coupled to the rotary shaft of the drive motor 22 and a disk gear. Such a configuration allows reduction in the size of the drive motor 22. The slide door 20 is opened and closed in accordance with rotation of the drum 23 as described above.

Furthermore, the ECU 40 is electrically connected to, for example, terminals 44*a*, 44*b* of a clutch motor 44 formed by a brush motor. The clutch motor 44 is drivingly coupled to a clutch mechanism 43*b* of the mechanism part 43. The clutch mechanism 43*b* is mechanically linked to the speed reduction mechanism 43*a*. As the clutch motor 44 switches the operating position of the clutch mechanism 43*b* between two positions, the clutch mechanism 43*b* selectively enables and disables transmission of rotation between the drive motor 22 and the drum 23 via the speed reduction mechanism 43*a*. Enabling and disabling of transmission of rotation between the drive motor 22 and the drum 23 performed by the clutch mechanism 43*b* is mechanical switching of the operating positions of the clutch mechanism 43*b* performed by the clutch motor 44. Thus, even after stopping the drive motor 22, the switching state at that point is maintained. In other words, the clutch mechanism 43*b* maintains the current switching state when not receiving power from the drive motor 22.

When the clutch mechanism 43*b* is switched to a state where transmission of rotation between the drive motor 22 and the drum 23 via the speed reduction mechanism 43*a* is allowed, the drum 23 rotates in accordance with activation of the drive motor 22, and the slide door 20 is opened or closed. When the clutch mechanism 43*b* is switched to a state where transmission of rotation between the drive motor 22 and the drum 23 via the speed reduction mechanism 43*a* is interrupted, even if the drum 23 is rotated by, for example, manual opening or closing operation of the slide door 20, the rotation is not transmitted to the drive motor 22 via the speed reduction mechanism 43*a*, and the slide door 20 can be opened or closed with small operating force.

Even in a case in which the clutch mechanism 43*b* is switched to a state where transmission of rotation between the drive motor 22 and the drum 23 via the speed reduction mechanism 43*a* is allowed, if the drive motor 22 is not in the afore-mentioned brake state, the drum 23 is rotated in accordance with manual opening or closing operation of the slide door 20, and the drive motor 22 is rotated via the speed reduction mechanism 43*a*. This is because the speed reduction efficiency of the speed reduction mechanism 43*a* is high. Thus, in this case also, the slide door 20 can be opened and closed with relatively small operating force.

The ECU 40 is electrically connected to an open/close operation switch 45 and detects whether opening or closing operation of the slide door 20 is being performed based on signals from the open/close operation switch 45. The ECU 40 is also electrically connected to a pulse sensor 46 and detects, for example, rotational position of the drive motor 22, that is, the operating position of the slide door 20 based on pulse signals from the pulse sensor 46. More specifically, an annular magnet rotated by the drive motor 22 is coupled to the drive motor 22. The polarity of the outer circumferential surface of the magnet alternately changes between a north pole and a south pole at every predetermined angle in the circumferential direction. The pulse sensor 46 includes a pair of Hall elements arranged to face the outer circumferential surface of the magnet. Each time the magnet, that is, the drive motor 22 is rotated by the predetermined angle, pulse signals having different phases from each other are output from the Hall elements. The ECU 40 thus detects the rotational position of the drive motor 22 by, for example, counting a rising edge (or a falling edge) of one of the pulse signals. The ECU 40 also detects the rotational speed of the drive motor 22 based on time intervals of the rising edge (or the falling edge), and detects a rotation direction (forward or reverse rotation) of the drive motor 22 based on the phase difference of the pulse signals.

Operation of the present embodiment will now be described.

Figure 4A:
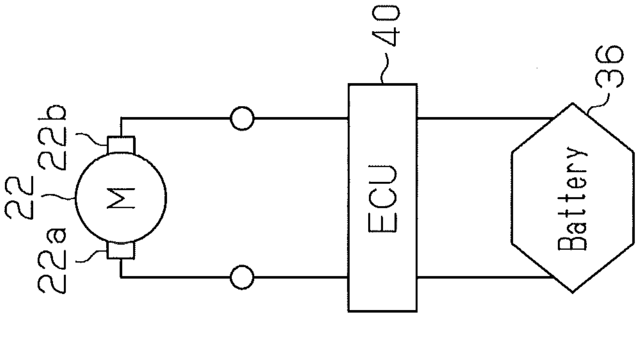
FIGS. 4(*a*) to 4(*c*) are schematic views illustrating operations of the door-opening/closing device for use in a vehicle of FIG. 1.
Figure 4B:
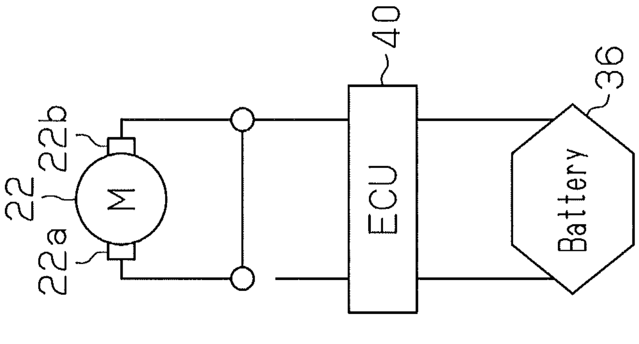
Figure 4C:
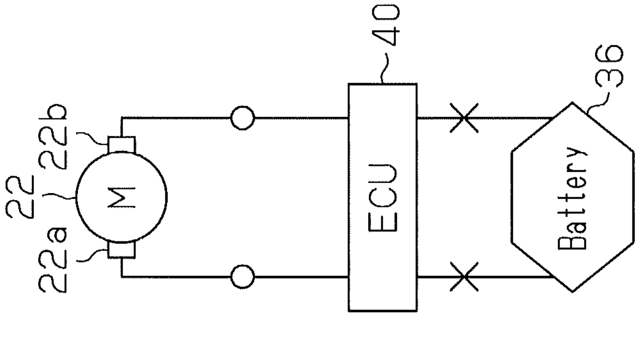

In FIG. 4(*a*), the first terminal 22*a* is connected to the ECU 40 by the relay 41 (see FIG. 3), and the drive motor 22 is in the energizable state. In this state, the ECU 40 rotates the drive motor 22 by supplying voltage to the drive motor 22 from the electricity supply unit 36 through the terminals 22*a*, 22*b*. The drive motor 22 rotates in the first direction or the second direction opposite to the first direction in accordance with the direction of supplied current. The slide door 20 is opened or closed in accordance with rotation direction of the drive motor 22.

In FIG. 4(*b*), the relay 41 (see FIG. 3) short-circuits the terminals 22*a*, 22*b*, and the drive motor 22 is in the brake state. In this state, the drive motor 22 may generate great cogging torque. The ECU 40, for example, switches the drive motor 22 into the brake state when the slide door 20 is at the fully open position (or any operating position other than the fully closed position) in order to retain the slide door 20 at the fully open position even on, for example, a slope road. In particular, when the clutch mechanism 43*b* is switched to the state that allows transmission of rotation between the drive motor 22 and the drum 23 via the speed reduction mechanism 43*a*, rotation transmitted from the drum 23 to the drive motor 22 is accelerated. The slide door 20 is retained by cooperation of the acceleration and torque reduction corresponding to the acceleration ratio.

In FIG. 4(*c*), the switching units (41, 42) are unable to perform switching control due to some kind of a malfunction such as a case where the electrical connection between the electricity supply unit 36 and the ECU 40 has been interrupted. In this state, the first terminal 22*a* is automatically connected to the ECU 40, and the drive motor 22 is brought into the energizable state. Thus, for example, even if the drive motor 22 has been switched to the brake state with the slide door 20 at the fully open position, the drive motor 22 is automatically switched to the energizable state when the switching units (41, 42) become unable to perform switching control. Even if the clutch mechanism 43*b* is left switched to the state that allows transmission of rotation between the drive motor 22 and the drum 23 via the speed reduction mechanism 43*a*, the slide door 20 can be closed to the fully closed position by relatively small operating force.

A basic control procedure for opening and closing the slide door 20 performed by the ECU 40 will now be described. The clutch mechanism 43*b* is assumed to have been switched to the state that allows transmission of rotation between the drive motor 22 and the drum 23 via the speed reduction mechanism 43*a*.

The control procedure for opening the slide door 20 performed by the ECU 40 will now be described. The process is started when the open/close operation switch 45 detects opening operation of the operation handle 35, and the closure/release actuator 33 causes the front lock 31 and the rear lock 32 to release the slide door 20 retained at the fully closed position. At this time, the drive motor 22 is switched to the energizable state.

Figure 5:
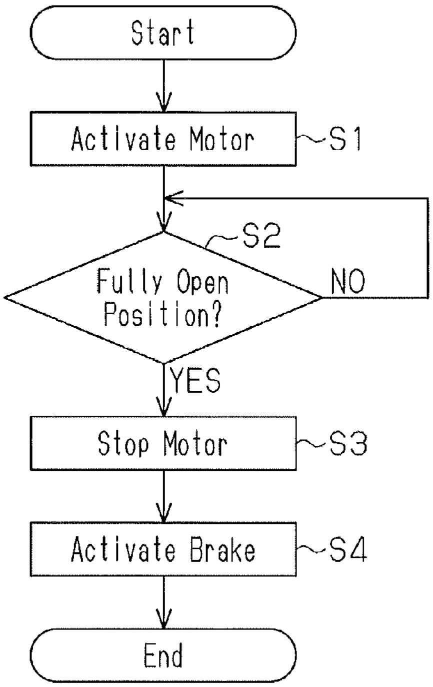
FIG. 5 is a flowchart showing a control procedure for opening operation of the door-opening/closing device for use in a vehicle of FIG. 1.

As shown in FIG. 5, when the process proceeds to this routine, the ECU 40 activates the drive motor 22 to open the slide door 20 (step S1). Subsequently, the ECU 40 determines whether the slide door 20 has reached the fully open position (step S2), and continues to activate the drive motor 22 until the slide door 20 reaches the fully open position. When the ECU 40 determines that the slide door 20 has reached the fully open position, the ECU 40 stops activating the drive motor 22 (step S3). Subsequently, the ECU 40 switches the drive motor 22 to the brake state (step S4), and ends the process.

The control procedure for closing the slide door 20 performed by the ECU 40 will now be described. The process is started when the open/close operation switch 45 detects closing operation of the operation handle 35. The drive motor 22 has been switched to the brake state as described above. The slide door 20 is assumed to be at the fully open position.

Figure 6:
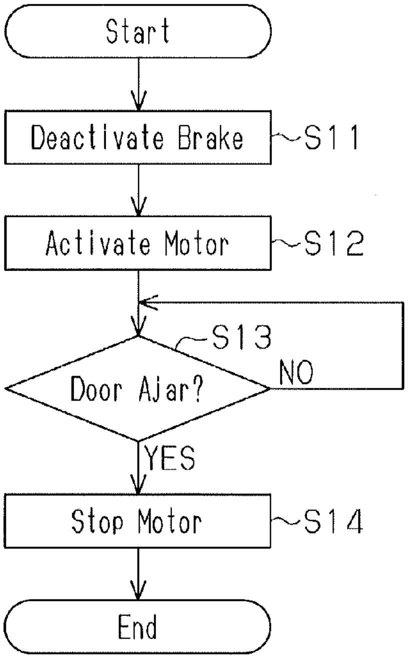
FIG. 6 is a flowchart showing a control procedure for closing operation of the door-opening/closing device for use in a vehicle of FIG. 1.

As shown in FIG. 6, when the process proceeds to this routine, the ECU 40 releases the drive motor 22 from the brake state and switches the drive motor 22 to the energizable state (step S11). The ECU 40 then activates the drive motor 22 to close the slide door 20 (step S12). Subsequently, the ECU 40 determines whether the slide door 20 has reached the ajar state (step S13), and continues driving the drive motor 22 until the slide door 20 reaches the ajar state. If the ECU 40 determines that the slide door 20 has reached the ajar state, the ECU 40 stops driving the drive motor 22 (step S14), and ends the process. The ajar state of the slide door 20 may be detected by a known latch switch (not shown) for detecting the state of the front lock 31 or the rear lock 32, or may be detected by the pulse sensor 46 as long as sufficient accuracy is ensured.

When the slide door 20 reaches the ajar state, the closure/release actuator 33 is activated to retain the slide door 20 at the fully closed position by the front lock 31 and the rear lock 32. The slide door 20 that has reached the ajar state is thus drawn into the fully closed position by the closure/release actuator 33, and is retained at the fully closed position by the front lock 31 and the rear lock 32. When the slide door 20 has reached the fully closed position, the drive motor 22 is of course kept switched to the energizable state.

The present embodiment has the following advantages.

(1) In the present embodiment, when the drive motor 22 is in the brake state, the slide door 20 can be retained at the fully open position even on, for example, a slope road by utilizing great cogging torque as a brake for the drive motor 22 (and the drum 23). Also, when the drive motor 22 is switched from the brake state to the energizable state, the state where the drive motor 22 may generate great cogging torque is cancelled, thereby releasing the slide door 20 retained at the fully open position. In this manner, since switching of electrical circuits in the switching units (41, 42) allows the slide door 20 to be retained and released, the configuration of the entire device is simplified as compared to a case with a conventional lock device (for example, a fully open position lock) and a release actuator. The number of components and the costs are prevented from increasing, and the weight of the slide door 20 is prevented from increasing.

(2) In the present embodiment, in the case where the clutch mechanism 43*b* is in the state that interrupts transmission of rotation between the drive motor 22 and the drum 23, the rotational torque of the drum 23 can be separated from the drive motor 22 when, for example, the slide door 20 is manually opened or closed. The slide door 20 can thus be opened or closed with small operating force. When the drive motor 22 is in the brake state, and the clutch mechanism 43*b* is in the state that allows transmission of rotation between the drive motor 22 and the drum 23, the rotational torque of the drum 23 can be transmitted to the drive motor 22. Since rotation transmitted from the drum 23 to the drive motor 22 is accelerated, the slide door 20 is retained by cooperation of the acceleration and torque reduction corresponding to the acceleration ratio.

(3) In the present embodiment, the switching units (41, 42) maintain the energizable state of the drive motor 22 while the switching units (41, 42) are not controlled to be switched (de-energized). Thus, for example, if the switching units (41, 42) are unable to perform switching control due to, for example, a malfunction when the slide door 20 is retained at the fully open position, great cogging torque generated by the drive motor 22 is eliminated. Thus, when manually closing the slide door 20 in such a state, the slide door 20 can be closed with relatively small operating force.

(4) In the present embodiment, since the speed reduction efficiency of the speed reduction mechanism 43*a* is increased, the size of the drive motor 22 is reduced accordingly.

(5) In the present embodiment, the locking and unlocking system is simplified by eliminating the conventional lock device (fully open position lock), and thus the number of components and the costs are prevented from increasing, and the weight of the slide door 20 is prevented from being increased.

(6) The present embodiment employs the mechanical clutch mechanism 43*b*, which operates upon receipt of mechanical force. Even if, during electrical opening or closing operation of the slide door 20, electricity supply to the drive motor 22 is stopped to stop opening or closing the slide door 20 due to, for example, pinch detection, the clutch mechanism 43*b* is maintained in the state that allows transmission of rotation between the drive motor 22 and the drum 23 via the speed reduction mechanism 43*a*. Thus, combined use of the clutch mechanism 43*b* with the pulse sensor 46 allows the slide door 20 to be opened or closed in a suitable manner when electricity supply to the drive motor 22 is resumed. The clutch mechanism 43*b* also does not require continual electricity supply to maintain the connection state as, for example, an electromagnetic clutch, and reduces electricity consumption.

The above described embodiment may be modified as follows.

Figure 7:
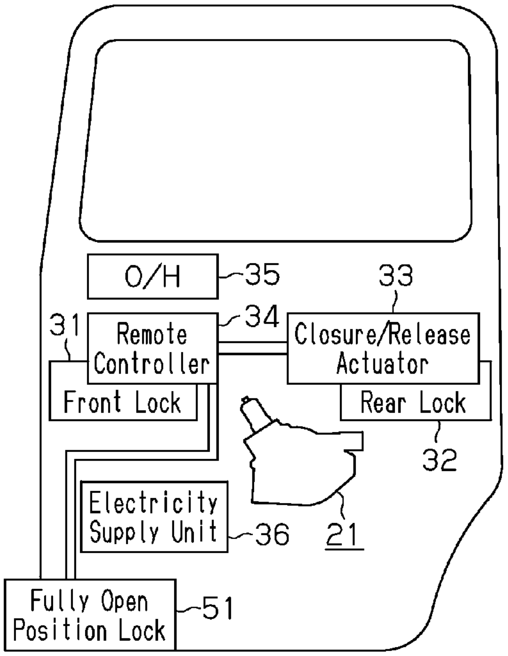
FIG. 7 is a schematic diagram illustrating a modification of the door-opening/closing device for use in a vehicle of FIG. 1.
Figure 8:
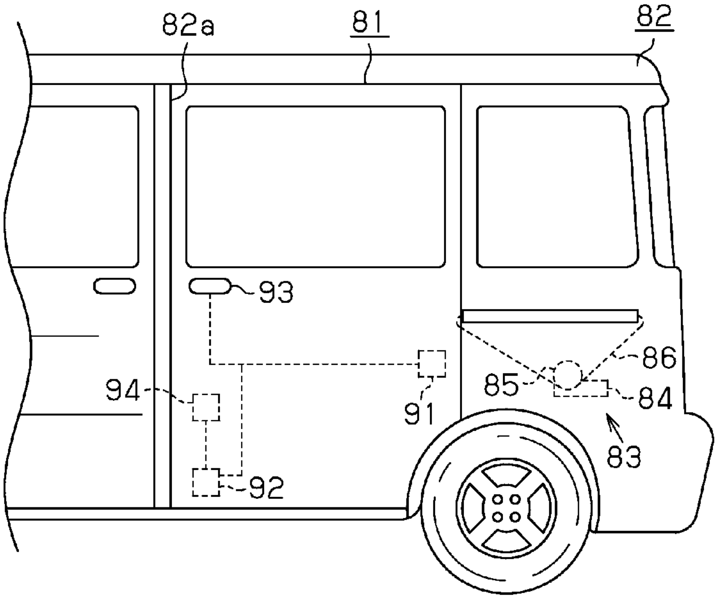
Fig.8 (Prior Art)
FIG. 8 is a schematic diagram illustrating a conventional door-opening/closing device for use in a vehicle.

As shown in FIG. 7, a fully open position lock 51 may be provided in the slide door 20. The fully open position lock 51 retains the slide door 20 at the fully open position by engaging with the vehicle body 10. The fully open position lock 51 is mechanically linked to the closure/release actuator 33 via the remote controller 34, and releases the slide door 20 retained at the fully open position upon reception of electrical operating force from the closure/release actuator 33. The fully open position lock 51 is also mechanically linked to the operation handle 35, and releases the slide door 20 retained at the fully open position also by receiving manual operating force from the operation handle 35.

When electric operating force (driving force) from the closure/release actuator 33 or manual operating force from the operation handle 35 is received while the fully open position lock 51 retains the slide door 20 at the fully open position, the fully open position lock 51 is disengaged from the vehicle body 10 and allows the slide door 20 to be closed.

In this case, when the drive motor 22 is switched to the brake state at any operating position between the fully closed position and the fully open position other than the fully closed position and the fully open position of the slide door 20, the slide door 20 is retained at that operating position. The configuration of the entire apparatus is thus simplified as compared to a case with a lock device for retaining the slide door 20 at any position or at a predetermined operating position between the fully closed position and the fully open position of the slide door 20 other than the fully closed position and the fully open position, and a release actuator for releasing the lock device.

In a case where a door-opening/closing device is applied to, for example, a door with an inside door handle or an outside door handle that is operated via a switch, the fully open position lock 51 and the front lock 31 may be mechanically coupled to the closure/release actuator 33 without the remote controller 34. In this case, the inside door handle or the outside door handle is electrically linked to the closure/release actuator 33.

In the above described embodiment, the drive motor 22 may be switched to the brake state at any operating position or the predetermined operating position other than the fully closed position of the slide door 20 to retain the slide door 20 at that operating position.

In the above illustrated embodiment, the fully open position or the fully closed position of the slide door 20 may be detected by an appropriate limiter switch, or by the pulse sensor 46 if sufficient accuracy is ensured.

In the above illustrated embodiment, the speed reduction mechanism 43*a* may be omitted, and the rotary shaft of the drive motor 22 may be directly connected to the drum 23.

In the above described embodiment, the speed reduction mechanism 43*a* may be a worm gear that has low speed reduction efficiency. In this case, however, a clutch is preferably provided to facilitate manual opening and closing operation of the slide door 20.

In the above described embodiment, enabling and disabling of transmission of rotation between the drive motor 22 and the drum 23 may be performed by an electromagnetic clutch instead of the clutch mechanism 43*b*. Alternatively, the clutch mechanism 43*b* may be omitted, and the drive motor 22 may be constantly connected to the drum 23 so that transmission of rotation is permitted.

In the above described embodiment, a mechanical check mechanism may further be provided for retaining the slide door 20 at the fully closed position in cooperation with the drive motor 22. Even if, for example, applied force exceeds the braking ability of the drive motor 22 on an unexpected slope road, the slide door 20 can be retained at the fully open position in cooperation with the check mechanism. A fall-off prevention cover for a lower roller in the guide roller unit 14 may also serve as the check mechanism.

In the above described embodiment, the polarity of the electricity supply unit 36, which is connected to the excitation coil 41*b*, may be reversed, and the transistor 42 may be replaced with a PNP transistor. The transistor 42 may also be a field-effect transistor (FET).

In the above described embodiment, the circuit configuration of the switching unit is one example. The transistor 42 may be omitted if, for example, the ECU 40 has the ability to directly activate the relay 41 (excitation coil 41*b*). Alternatively, the circuit may be configured by combination of only semiconductor switches (bipolar transistor, FET) as long as the rated current is not exceeded.

In the above described embodiment, the switching units may be modified to switching units that maintain the brake state of the drive motor 22 when the switching units are not performing switching control (de-energized).

DESCRIPTION OF THE REFERENCE NUMERALS

10 . . . vehicle body, 20 . . . slide door (vehicle door), 21 . . . driving member, 22 . . . drive motor (permanent magnet motor), 22*a*, 22*b* . . . terminals, 23 . . . drum (output member), 40 . . . ECU (switching unit), 41 . . . relay (switching unit), 42 . . . transistor (switching unit), 43 . . . mechanism part, 43*a* . . . speed reduction mechanism, 43*b* . . . clutch mechanism (clutch).

The invention claimed is:

1. A door opening and closing device for use in a vehicle, comprising:

a driving member including a permanent magnet motor with two terminals and an output member rotationally driven by the permanent magnet motor, wherein the driving member is configured to be located on one of a vehicle body or a vehicle door and connected to the other one of the vehicle body or the vehicle door via the output member, so that the vehicle door is opened and closed in accordance with rotation of the output member; and a switching unit configured to selectively switch the permanent magnet motor between an energizable state, in which the permanent magnet motor can receive electricity via the two terminals, and a brake state, in which the terminals are connected to each other so that the permanent magnet motor forms an electric closed-loop path and cannot receive electricity, wherein, when the vehicle door is at any operating position other than a fully closed position, the switching unit switches the permanent magnet motor into the brake state, wherein the switching unit is configured to switch the permanent magnet motor into the brake state when the switching unit is energized, and maintain the permanent magnet motor in the energizable state when the switching unit is de-energized.

2. A door opening and closing device for use in a vehicle, comprising:

a driving member including a permanent magnet motor with two terminals and an output member rotationally driven by the permanent magnet motor, wherein the driving member is configured to be located on one of a vehicle body or a vehicle door and connected to the other one of the vehicle body or the vehicle door via the output member, so that the vehicle door is opened and closed in accordance with rotation of the output member;

a switching unit configured to selectively switch the permanent magnet motor between an energizable state, in which the permanent magnet motor can receive electricity via the two terminals, and a brake state, in which the terminals are connected to each other so that the permanent magnet motor forms an electric closed-loop path and cannot receive electricity, wherein, when the vehicle door is at any operating position other than a fully closed position, the switching unit switches the permanent magnet motor into the brake state; and a processor configured to control a switching operation of the switching unit, wherein the switching unit is configured to maintain the permanent magnet motor in the energizable state when the processor becomes unable to control the switching operation of the switching unit.

3. The door opening and closing device for use in a vehicle according to claim 1, further comprising a clutch located between the permanent magnet motor and the output member, wherein the clutch enables and disables transmission of rotation between the permanent magnet motor and the output member.

4. The door opening and closing device for use in a vehicle according to claim 3, wherein the clutch is a mechanical clutch operated upon receipt of mechanical force.

5. The door opening and closing device for use in a vehicle according to claim 1, further comprising a speed reduction mechanism located between the permanent magnet motor and the output member, wherein the speed reduction mechanism reduces the speed of rotation of the permanent magnet motor and transmits the rotation to the output member.

6. The door opening and closing device for use in a vehicle according to claim 2, further comprising a clutch located between the permanent magnet motor and the output member, wherein the clutch enables and disables transmission of rotation between the permanent magnet motor and the output member.

7. The door opening and closing device for use in a vehicle according to claim 6, wherein the clutch is a mechanical clutch operated upon receipt of mechanical force.

8. The door opening and closing device for use in a vehicle according to claim 2, further comprising a speed reduction mechanism located between the permanent magnet motor and the output member, wherein the speed reduction mechanism reduces the speed of rotation of the permanent magnet motor and transmits the rotation to the output member.

9. The door opening and closing device for use in a vehicle according to claim 1, wherein the vehicle door is a slide door that moves in a fore-and-aft direction of the vehicle to open and close a door opening of the vehicle body.

10. The door opening and closing device for use in a vehicle according to claim 2, wherein the vehicle door is a slide door that moves in a fore-and-aft direction of the vehicle to open and close a door opening of the vehicle body.

* * * * *